UNITED STATES PATENT OFFICE.

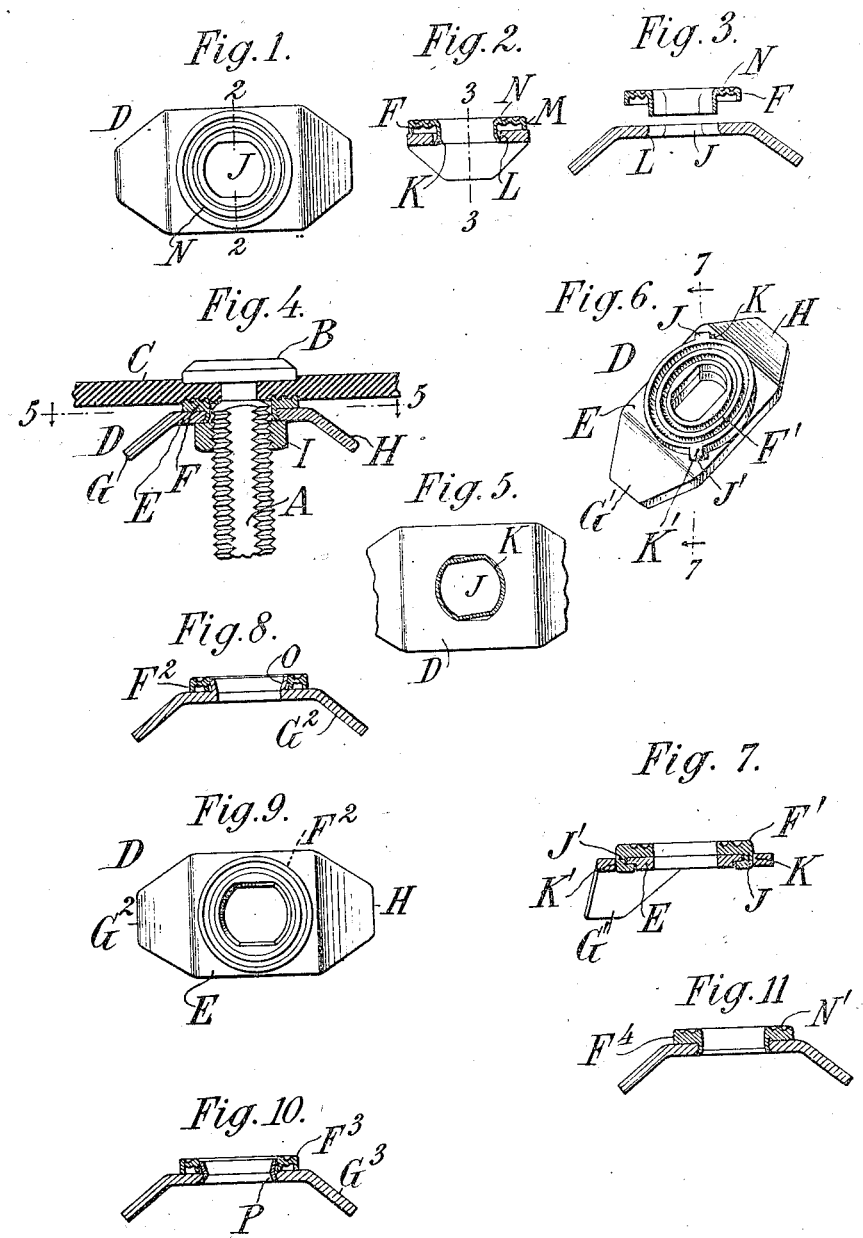

MAXIMILIAN CHARLES SCHWEINERT, OF WEST HOBOKEN, AND HENRY P. KRAFT, OF RIDGEWOOD, NEW JERSEY, ASSIGNORS TO A. SCHRADER'S SON, INCORPORATED, OF BROOKLYN, NEW YORK, A CORPORATION OF NEW YORK.

COMBINED BRIDGE-WASHER AND RING-WASHER.

1,322,830.  Specification of Letters Patent.   Patented Nov. 25, 1919.

Application filed April 17, 1914. Serial No. 832,499.

*To all whom it may concern:*

Be it known that we, MAXIMILIAN CHARLES SCHWEINERT and HENRY P. KRAFT, citizens of the United States of America, and residing in West Hoboken, in the county of Hudson and State of New Jersey, and Ridgewood, in the county of Bergen and State of New Jersey, respectively, have invented certain new and useful Improvements in Combined Bridge-Washers and Ring-Washers, of which the following is a specification.

This invention relates to a combined bridge washer and ring washer for pneumatic tire valves.

Bridge washers usually comprise an elongated member having tapered end flanges bent downwardly with relation to the body, and are adapted to be used on the inner ends of pneumatic tire valves, the tapered ends of the bridge washer fitting between the edges of the shoe or casing and being adapted to hold the valve in place. The inner end of the valve has been usually provided with a flange extending within the inner tube, and the valve has been also provided with a ring-shaped washer adapted to be clamped against the outer surface of the tube. Usually this clamping action is secured by a nut which screws on the valve casing outside of the bridge washer and forces both the bridge washer and ring washer forwardly until the clamping action is obtained. Usually both the bridge washer and ring washer are provided with elongated slots through which the valve casing extends, such casing having a similar cross-section so as to prevent rotation of the washers. According to the present invention we provide a combined bridge washer and ring washer so associated that they may be handled as a unit, thereby facilitating the operation of securing the valve in the inner tube. This construction is adopted for the reason that it is desirable to form the ring washer of brass in order that it may adhere to the rubber tube and make a better joint, and to form the bridge washer of iron or steel since this is separated from the tube, and strength and cheapness demand that a stronger and less expensive material than brass be used. Preferably also we construct the parts so as to permit a slight relative rotative movement between the two in order that in use there may be no distortion of the rubber or twisting of the valve.

In the drawings, wherein we have illustrated several forms of the invention,—

Figure 1 is a top view of the preferred construction.

Fig. 2 is a section on the line 2—2 in Fig. 1.

Fig. 3 is a section at right angles to Fig. 2, and showing the parts before assembly.

Fig. 4 is a sectional view of the parts applied to an inner tube and showing the valve in elevation.

Fig. 5 is a sectional view, illustrating the capacity of the parts for relative movement.

Fig. 6 is a perspective view of a modified form.

Fig. 7 is a sectional view of Fig. 6 on the line 7—7.

Fig. 8 is a longitudinal section of another modification.

Fig. 9 is a top view of the construction of Fig. 8.

Fig. 10 is a longitudinal section of still another modification.

Fig. 11 is a longitudinal section of another modification.

Referring first to Figs. 1 to 4 of the drawings, A is a suitable valve having an inner flange B designed to be inserted through an opening in the inner tube C and to contact with the inner face of the tube. Encircling the valve casing A is a ring washer F usually formed with a corrugated face and designed to be forced against the outer surface of the tube to clamp the latter against the flange B. D is the bridge washer which is usually in practice made separable from the ring washer and also fits over the valve casing A. A nut I forces the bridge washer and ring washer forwardly until the desired clamping action is obtained. The bridge washer D is usually an elongated member having tapered ends which are bent downwardly and are designed to engage and fit between the inner edges of the tire shoe. As heretofore constructed both the bridge washer and the ring washer have been formed with elongated holes J through which the valve casing A extends, the valve casing being flattened to form a non-rotative connection with the washers.

The bridge washer is commonly made of iron and steel on account of its strength and cheapness while the ring washer has usually been made of brass, since this metal permits it to adhere better to the rubber of the tube C and form a tighter joint than is possible with iron or steel. These and other conditions have resulted in the manufacturing of the two washers as separate parts.

According to the present invention we provide a combined bridge washer and ring washer, the ring washer being preferably made of brass and the bridge washer being preferably made of iron or steel. In the construction shown in Figs. 1 to 5 the hole J through the bridge washer is enlarged and the ring washer is formed with a flange K which fits within the hole J of the bridge washer and is turned back or riveted to connect the parts together. Preferably the hole through the bridge washer is beveled as shown at L in order to make a more effective rivet.

The ring washer F is preferably constructed of sheet metal as illustrated. In order to provide sufficient depth or thickness, it is formed with an inturned flange M which abuts against the inner face of the bridge washer. In order to secure a better connection between the washer and the tube C, the washer is preferably corrugated as shown at N, the corrugations being embedded in the tube in use. With such sheet metal construction the corrugations are formed by stamping the body of the metal. As thus constructed, the bridge washer and ring washer may be rigidly united if desired, so that there is no relative movement possible between the two.

It is preferred, however, to provide a capacity for a certain limited relative movement between the two washers in order that the parts may find their proper positions without strain, and in Fig. 5 especially is shown one means of accomplishing this result, which means may be also considered to apply to Figs. 1 to 4. In this construction the flange K of the bridge washer is made of substantially the same shape as the hole through the bridge washer except that it is somewhat narrower, and the flange K in place of being rigidly riveted down, is riveted to such an extent as to hold the parts together while permitting slight rotational movements.

In Figs. 6 and 7 is illustrated a modified construction in which the ring washer F' is provided with short flanges or lugs J' J² which pass through slots K' K² formed in the bridge washer G', and are riveted on the opposite side thereof. If a slight relative movement is desired, the slots K' K² may be slightly enlarged as shown, and the lugs J' J² loosely riveted.

In Figs. 8 and 9 a further modification is illustrated in which the bridge washer G² is constructed with a flange O formed by stamping down the metal of the washer, which flange passes through an aperture in the ring washer F² and is turned outward to hold the parts together. The flange and aperture in the ring washer may be circular as shown so as to permit complete rotation, or may be oblong so as to permit only limited rotational movements, or the parts may be tightly connected.

In Fig. 10 the bridge washer G³ and the ring washer F³ are united by a separate retaining member P, and in this figure also a slight rotational movement may be provided for in the same way as in Fig. 5.

In Fig. 11 a modification is illustrated wherein the ring washer F⁴ is connected in substantially the same manner as in Figs. 1 to 5, but it is constructed of heavier metal, so that its corrugations N' are formed only on the outer face thereof.

By the present invention we are enabled to form a combined bridge washer and ring washer in which the major part of the device is constructed of cheap and strong metal and the minor part in weight of more expensive and more effective metal, such as brass. We are also enabled to provide a construction in which the parts have the desirable slight rotational movement combined with the convenience of their being connected so that the two members may be handled as a single unit. While the rotational movement desired is only necessarily slight, the parts may be capable of complete relative rotation without detriment. In the use of any of the constructions described it is desirable that the bridge washer shall be substantially fixed against rotation with relation to the valve casing, and consequently the parts are preferably so constructed that at least one of them has a flat-sided oblong opening which will prevent such substantially rotative movement.

It will be understood that the term "bridge washer" as used herein includes the various types of devices which fit between the inner sides of the tire shoe to hold the latter in place.

While we have shown and described several embodiments of the invention, it will be understood that we do not wish to be limited thereto, since various changes may be made therein without departing from the invention.

What we claim is:—

1. As a new article of manufacture, a bridge washer and a ring washer separately formed and connected one to the other to permit a rotative movement of the parts relative to each other.

2. As a new article of manufacture, a bridge washer and a ring washer separately formed and connected independently of the valve stem to permit a slight rotative movement of the parts relative to each other.

3. As a new article of manufacture, a bridge washer and a ring washer, one of said parts having an elongated slot and the other of said parts having a similar slot, and means connecting said washers one to the other adapted to permit a slight rotative movement of the parts relative to each other.

4. As a new article of manufacture, a combined bridge washer and ring washer, one of said parts having a flange passing through a hole in the other of said parts.

5. As a new article of manufacture, a combined bridge washer and ring washer, the ring washer having a flange passing through a hole in the bridge washer.

6. As a new article of manufacture, a combined bridge washer and ring washer, the ring washer having a flange passing through a hole in the bridge washer, and both said parts having elongated slots, and the flange of the said ring washer being of less width than the hole through said bridge washer, whereby to permit slight rotative movements of the ring washer relatively to the bridge washer.

7. As a new article of manufacture, a combined bridge and ring washer, the ring washer being formed of sheet brass or similar non-oxidizable material, and having a flange extending through the bridge washer and turned over the latter.

8. As a new article of manufacture, a combined bridge washer and ring washer, the ring washer being formed of sheet brass stamped to form circular corrugations on its outer face, and the parts being united by a flange on one part passing through a hole in the other part.

9. As a new article of manufacture, a combined bridge washer and ring washer, the ring washer being formed of sheet brass or similar non-oxidizable material, and one of said parts having a non-circular flange entering a non-circular hole in the other part.

10. As a new article of manufacture, a combined bridge washer and ring washer, the ring washer being formed of sheet brass or similar non-oxidizable material, and one of said parts having a non-circular flange entering a non-circular hole in the other part, and said ring washer being hollow and having an outside flange which rests on the face of the bridge washer.

In witness whereof we have hereunto signed our names in the presence of two subscribing witnesses.

MAXIMILIAN CHARLES SCHWEINERT.
HENRY P. KRAFT.

Witnesses:
G. V. MYERS,
FRED WHITE.